(12) United States Patent
Rehder et al.

(10) Patent No.: US 7,111,644 B2
(45) Date of Patent: *Sep. 26, 2006

(54) MANIFOLD

(75) Inventors: Randall J. Rehder, Wilmington, NC (US); Gary Hutko, Wilmington, NC (US); L. James Knowles, Wilmington, NC (US)

(73) Assignee: Sea Tech, Inc., Wilmington, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/204,924

(22) Filed: Aug. 16, 2005

(65) Prior Publication Data

US 2006/0032542 A1    Feb. 16, 2006

Related U.S. Application Data

(63) Continuation of application No. 10/405,901, filed on Apr. 2, 2003, now Pat. No. 6,929,032.

(51) Int. Cl.
*F16K 11/22* (2006.01)

(52) U.S. Cl. ...................... 137/884; 137/270

(58) Field of Classification Search ............... 137/269, 137/270, 883, 884, 887
See application file for complete search history.

(56) References Cited

U.S. PATENT DOCUMENTS

| | | | |
|---|---|---|---|
| 3,538,940 A | 11/1970 | Graham | |
| 3,560,027 A | 2/1971 | Graham | |
| 3,653,689 A | 4/1972 | Sapy et al. | |
| 3,934,605 A | 1/1976 | Legris | |
| 4,177,835 A | 12/1979 | Paley | |
| 4,573,716 A | 3/1986 | Guest | |
| 4,645,246 A | 2/1987 | Guest | |
| 4,657,286 A | 4/1987 | Guest | |
| 4,722,560 A | 2/1988 | Guest | |
| 4,807,911 A | 2/1989 | Short | |
| 4,848,391 A | 7/1989 | Miller et al. | |
| 4,946,213 A | 8/1990 | Guest | |
| 5,174,611 A | 12/1992 | Fyrd et al. | |
| 5,230,539 A | 7/1993 | Olson | |
| 5,549,865 A | 8/1996 | Guests | |
| 5,564,757 A | 10/1996 | Seabra | |
| 5,584,513 A | 12/1996 | Sweeny et al. | |
| 5,909,902 A | 6/1999 | Seabra | |
| 6,058,975 A | 5/2000 | Hui-Chen | |
| 6,065,779 A | 5/2000 | Moner et al. | |
| 6,267,417 B1 | 7/2001 | Fan | |
| 6,425,416 B1 | 7/2002 | Narita et al. | |
| 6,447,019 B1 | 9/2002 | Hosono et al. | |

FOREIGN PATENT DOCUMENTS

| | | |
|---|---|---|
| EP | 0554111 A1 | 8/1993 |
| EP | 0558844 A1 | 9/1993 |
| EP | 1032785 B1 | 12/2002 |
| GB | 2211506 A | 7/1989 |
| GB | 2331564 A | 5/1999 |

*Primary Examiner*—John Fox
(74) *Attorney, Agent, or Firm*—Fish & Richardson P.C.

(57) ABSTRACT

A manifold with interconnecting, non-threaded modular sections. The connected sections define a fluidic passageway and at least one valved outlet. The valved outlet is reversible to enable the valve to be readily accessible when the modular section is in any orientation. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 C.F.R. § 1.72(b).

12 Claims, 11 Drawing Sheets

SECTION A-A

SECTION B-B

SECTION C-C

SECTION D-D

MANIFOLD

CROSS-REFERENCES TO RELATED APPLICATIONS

This application is a Continuation under 35 U.S.C. §120 of U.S. patent application Ser. no. 10/405,901, filed Apr. 2, 2003, now U.S. Pat. No. 6,929,032.

BACKGROUND OF THE INVENTION

1. Field of the Invention

This invention relates to fluid control devices and, in particular, this invention relates to devices partitioning fluid under pressure to one or more fixtures.

2. Background of the Invention

Manifolds are often used to direct fluid from a main supply source to several fixtures. These manifolds may include modular components to accommodate varying patterns of distribution, the patterns often unique at each installation. These modular components may include valved outlets. The modular components are ideally mated quickly and efficiently in fluid-tight connections. Methods of securing mated modular components often involve threaded connectors, couplers, or the like. Each of these methods may require extensive time and specialized tools to assemble and disassemble the manifold.

In view of the foregoing, there is a need for a manifold with modular components, which can be assembled quickly and efficiently without extensive or specialized tools. There is also a need for a manifold, which can be disassembled and reassembled to provide fluids for a changed pattern of fixtures.

SUMMARY OF THE INVENTION

The present invention substantially meets the aforementioned needs of the industry by providing a modular manifold section. The manifold section may include a body portion, a first outlet extending integrally from the body portion, and an optional second outlet extending integrally from the body portion and generally opposed to the first outlet. The body portion may define a body portion passageway and may include a male connecting structure disposed at a first end of the body portion. A first pair of brackets flanking the male connecting structure may be present. The body portion may also include a female connecting structure disposed at a second end thereof. A second pair of brackets may flank the female connecting structure. Each of the first and second pair of brackets may define a plurality of openings accommodating a locking pin. The first outlet may define a first outlet passageway, which may open into the body portion passageway. The first outlet may also include a valve. The valve may include a valve spool and a valve housing accommodating the valve spool. The valve housing may be formed integrally with the remainder of the outlet and with the manifold section body portion. The valve housing may accommodate the valve spool such that the valve spool is insertable in the valve housing in a first vertical position, or in a second vertical position, the second position oriented generally 180 degrees with respect to the first position.

A manifold section is provided having a manifold section body and an inlet extending from the manifold section body. The manifold section body may define a manifold section body passageway and may include a female connecting structure disposed at a first end of the manifold section body and a pair of brackets flanking the female connecting structure. Each of the pair of brackets may define a plurality of openings accommodating a locking pin. The inlet may extend from a second end of the manifold section and may define an inlet passageway. The inlet passageway may be substantially coaxial to the manifold section body passageway.

A method of assembling a manifold is provided. The manifold may include a first manifold section and a second manifold section. Each of the first and second manifold sections may include a body portion and an outlet portion integral to the body portion. Each body portion may include a male connecting structure disposed at one end of the body portion and an opposed pair of brackets generally flanking the male connecting structure. Each of the manifold sections may further include a female connecting structure disposed at another end of the body portion and a generally opposed pair of female brackets flanking the female connecting structure. The method may include mating the female connecting structure of the first manifold section to the male connecting structure of the second manifold section. The method may further include securing the mated first and second sections by accommodating a locking pin accommodated in aligned male and female brackets.

A method of manufacturing a manifold section is also provided. The method may include forming a body portion having a male connector at one end of the body portion and a female connector at another and of the body portion, an opposed pair of male brackets flanking the male connector, and an opposed pair of female brackets flanking the female connector. The body portion may define an interior fluidic passageway. The method may also include integrally forming an outlet with the body portion, the outlet defining an outlet passageway in fluid communication with the body portion passageway and containing a reversible valve.

It is a feature that the present manifold includes a plurality of modular sections.

It is an advantage that the modular sections of the present manifold enable configurations for any number and the disposition of fluid-consuming fixtures.

It is a feature of the present invention that the modular sections thereof include non-threaded matable male and female connecting structures.

It is an advantage that the modular sections can be interconnected without wrenches or other tools and supplies necessary for threaded fittings.

It is another advantage that the modular sections can be separated without wrenches or other tools necessary for threaded fittings.

It is a feature of the present invention that modular sections thereof include invertible valve components.

It is an advantage of the invertible valve components that the valve may be configured so that valve handles are always easily accessible.

It is a feature of the present invention that mated modular sections are fixed in place by inserting removable locking pens.

It is an advantage that the present manifold may be reconfigured to meet changed requirements by removing the locking pins and separating previously mated modular sections.

It is another advantage that the present manifold sections may be interconnected using locking pins, rather than tools such as wrenches required for threaded openings.

It is a feature of the present invention that the modular sections can be mated in a first configuration or in a second configuration, the second configuration in which one of the modular sections is rotated 180 degrees about the modular section longitudinal axis.

It is an advantage of the present invention that modular sections with single outlets can be oriented in a desired direction.

It is understood that the above-described figures are only illustrative of the present invention and are not contemplated to limit the scope thereof.

DETAILED DESCRIPTION

Any references to such relative terms as front and back, upper and lower, inboard and outboard, or the like, are intended for convenience of description and are not intended to limit the present invention or its components to any one positional or spatial orientation. All dimensions of the components in the attached figures may vary with a potential design and the intended use of an embodiment of the invention without departing from the scope of the invention.

Each of the additional features and methods disclosed herein may be utilized separately or in conjunction with other features and methods to provide improved manifolds and methods for making the same. Representative examples of the teachings of the present invention, which examples utilize many of these additional features and methods in conjunction, will now be described in detail with reference to the drawings. This detailed description is merely intended to teach a person of skill in the art further details for practicing aspects of the present teachings and is not intended to limit the scope of the invention. Therefore, specific combinations of features and methods disclosed in the following detailed description may not be necessary to practice the invention in the broadest sense and are instead taught merely to particularly describe representative and preferred embodiments of the invention.

Figure 1:
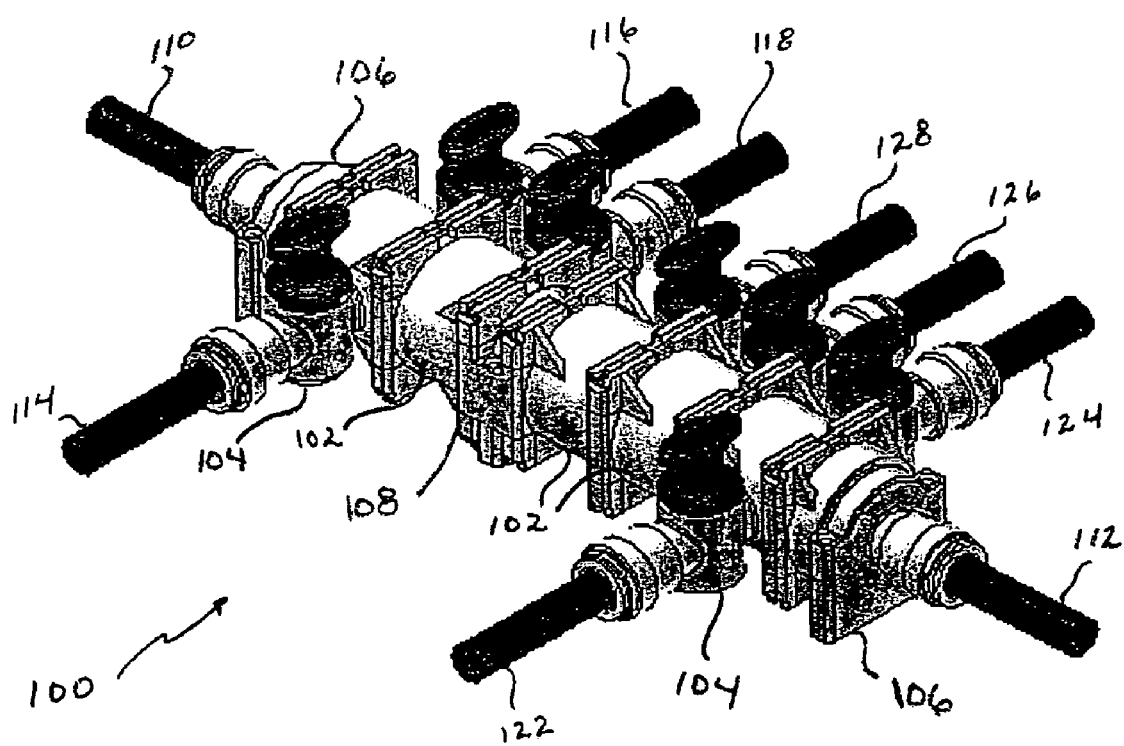
FIG. 1 is a perspective view of one embodiment of the present manifold.
Figure 2:
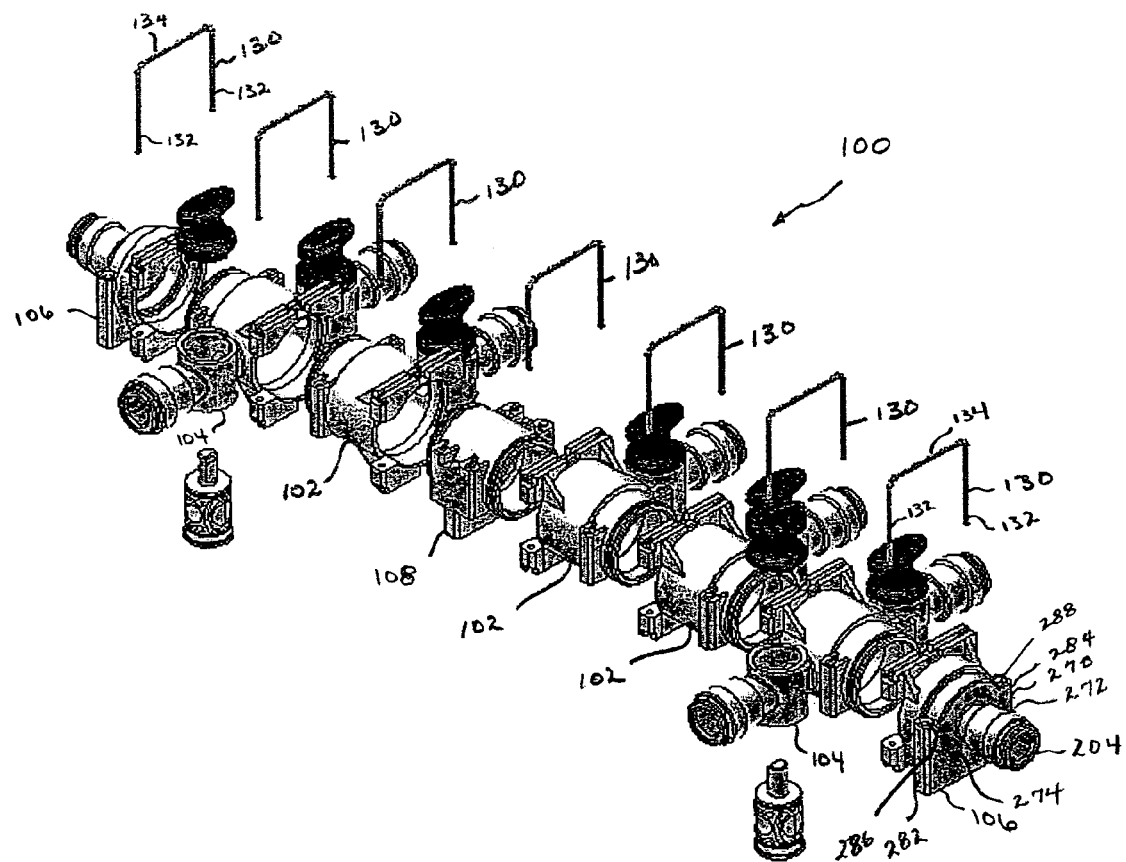
FIG. 2 is a perspective, exploded view of the manifold of FIG. 1.
Figure 3:
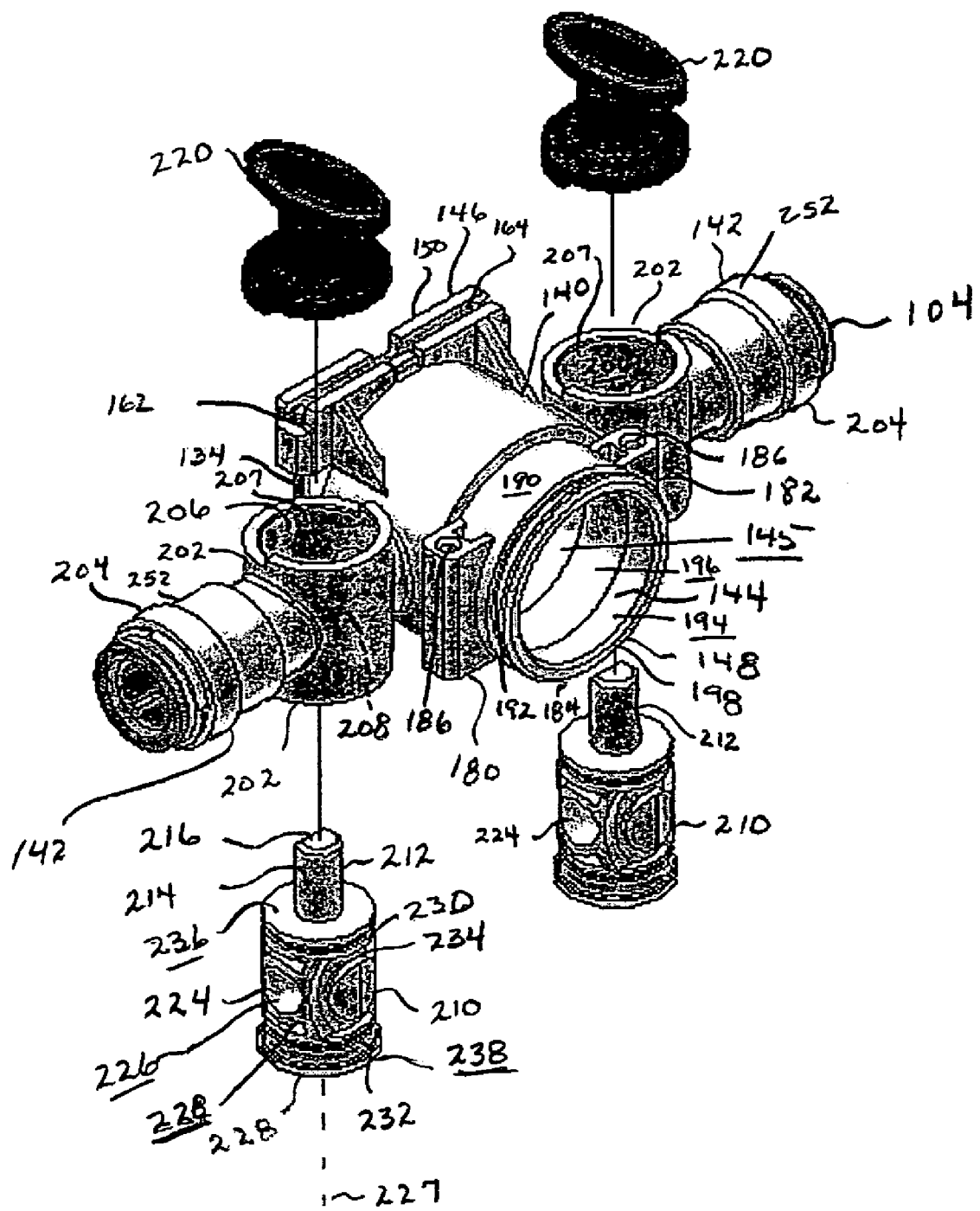
FIG. 3 is a perspective, exploded view of a double section of the manifold of FIG. 1.
Figure 4:
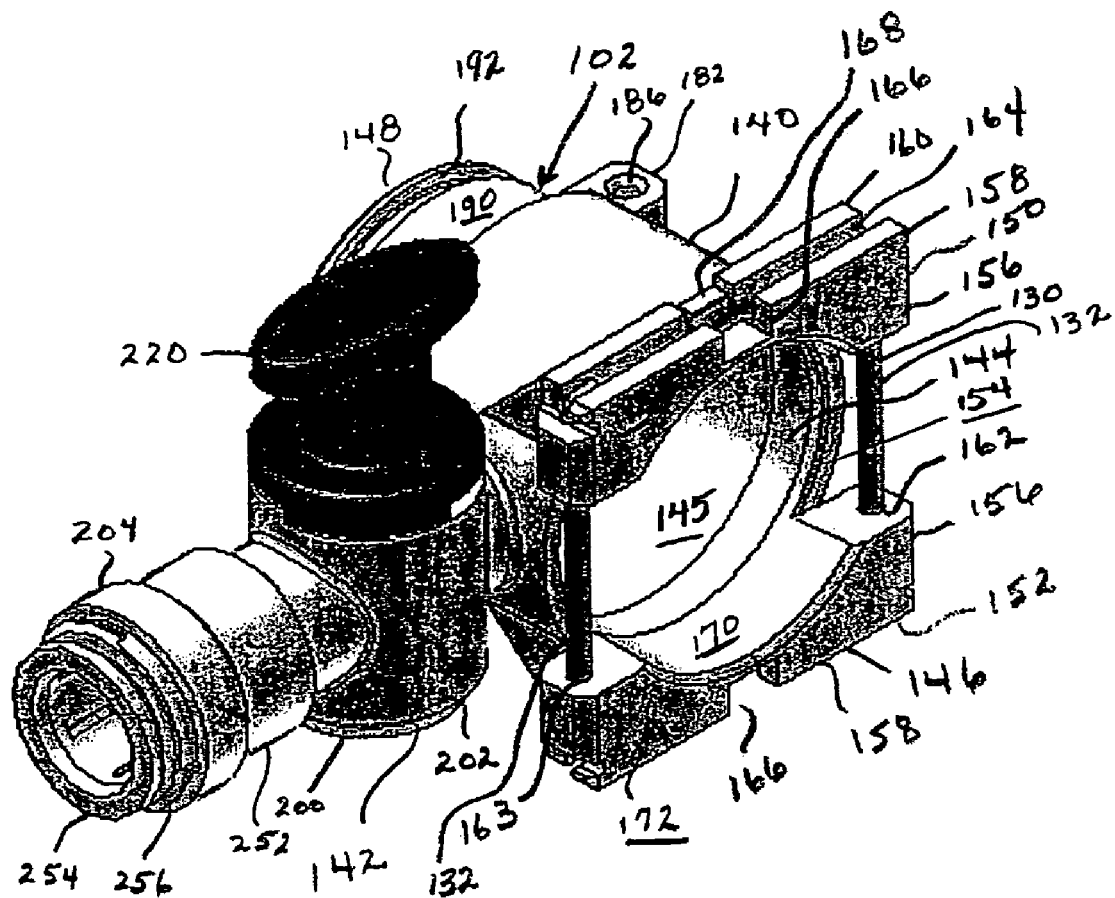
FIG. 4 is a perspective view of a single section of the manifold of FIG. 1.
Figure 5:
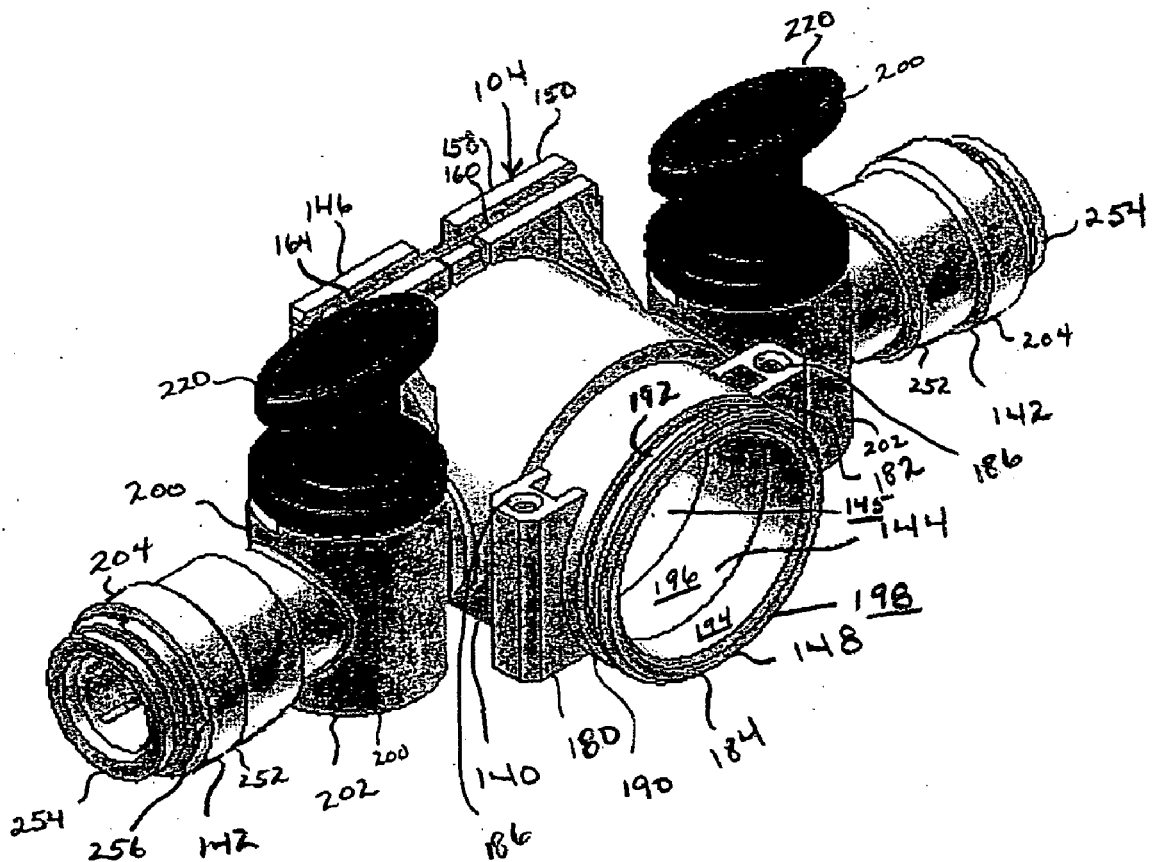
FIG. 5 is a perspective view of the double section of FIG. 3.
Figure 6:
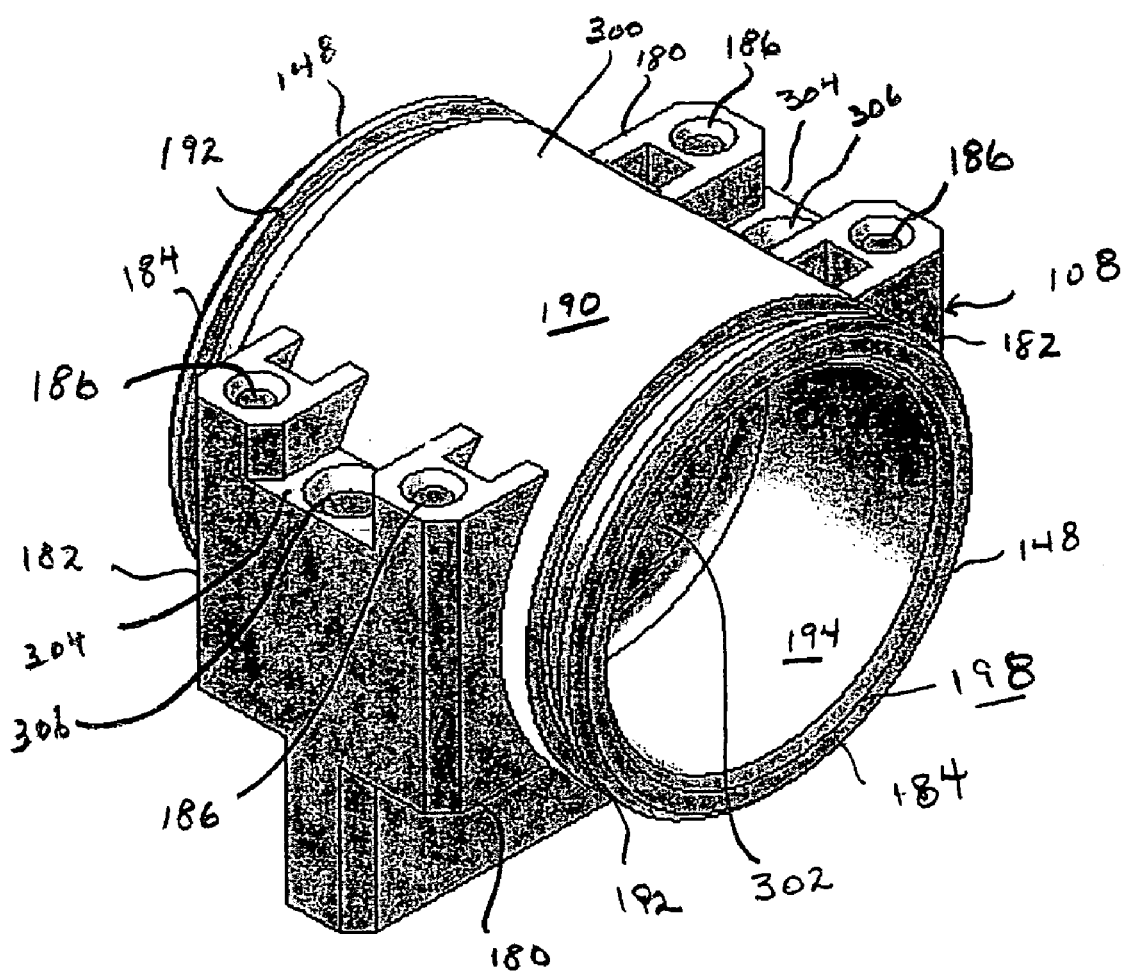
FIG. 6 is a perspective view of the of the divider section of the manifold of FIG. 1.
Figure 7:
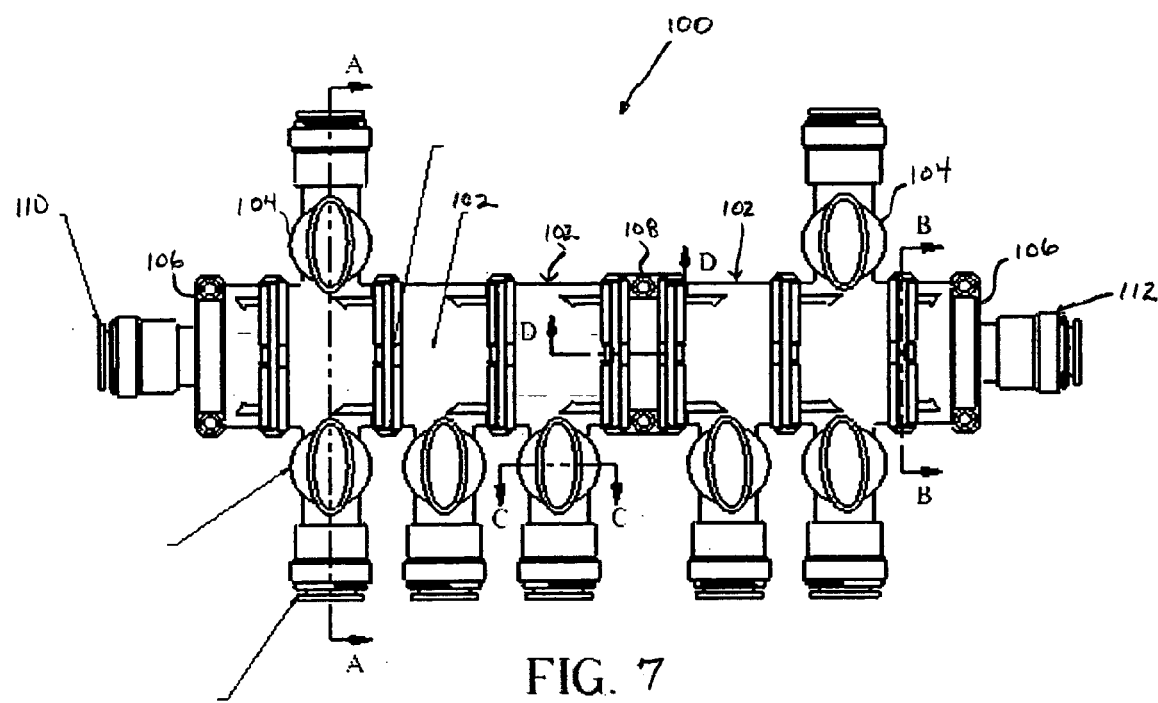
FIG. 7 is a plan view of the manifold of FIG. 1.
Figure 8:
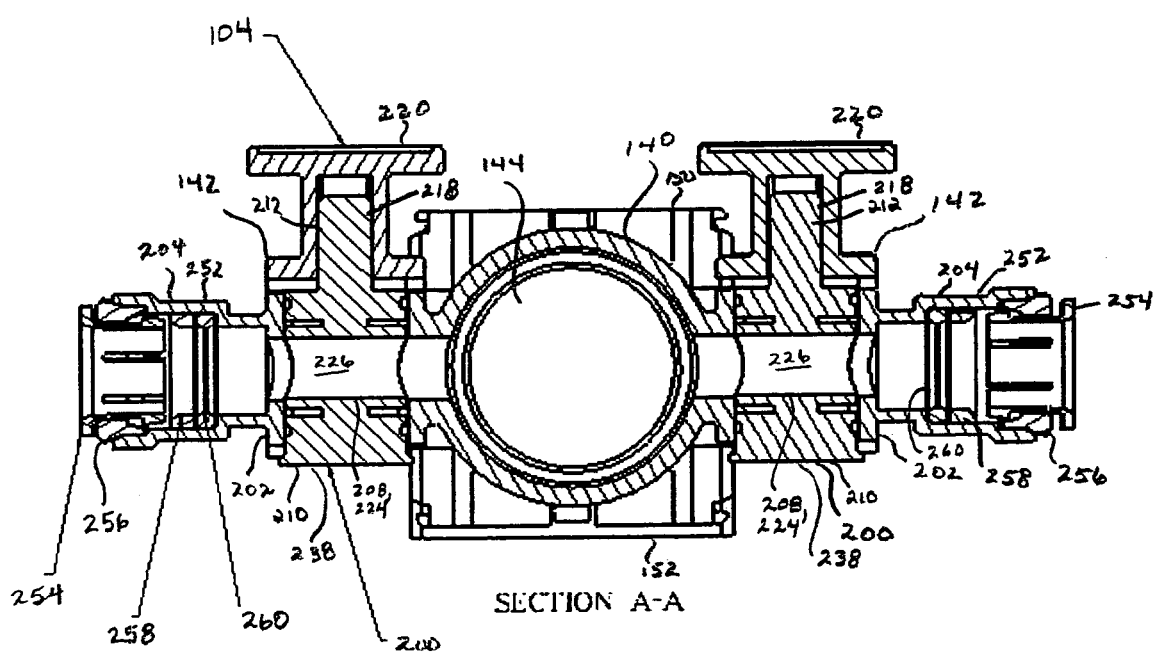
FIG. 8 is a cross section of the manifold of FIG. 7 taken line A—A.

An exemplary modular manifold embodiment is depicted in FIGS. 1, 2, and 7 generally at 100. Exemplary modules include a single section 102, a double section 104, an end section 106, and a divider section 108. The manifold 100 may be advantageously used to provide fluids, such as fresh water, to several fixtures from single hot and cold water supply sources. However, it should be understood that the present manifold may be used to supply fixtures with a single fluid source as well. It is also contemplated that the present manifold could be configured to supply several sources of fluid to fixtures, e.g., three or more types of fluids.

In the embodiment depicted in FIG. 1, a hot water supply tubing 110 and a cold water supply tubing 112 convey hot and cold water from supply sources (not shown) to fixtures (not shown). Hot water from the tubing 110 is conveyed to plumbing fixtures via the double section 104 into tubing members 114 and 116 and via the single section 102 into a tubing member 118. In a similar manner, cold water is conveyed from the cold water supply tubing, 112 to plumbing fixtures via the double section 104 in to tubing members 122 and 124 and via the single sections 102 into tubing members 126 and 128. The present manifold sections can be assembled to provide supply fluids to virtually any configuration of fixtures, e.g., advantageously by connectors such as locking pins 130 having prongs 132 depending from a cross member 134. The connectors can to inserted or withdrawn easily and quickly and without specialized tools. Alternatively, other connectors such as cotter pins or the like may be used as well. Moreover, the present modular manifold can be readily adapted to changing needs, in which modular sections are removed or added as dictated by the change. Additionally, assembly and reassembly of the present modular manifold assembly is effected without wrenches, solder, heat sources (e.g., torches), caulking, or other tools and supplies necessary when threaded or soldered components are used.

Referring to FIGS. 3–5, 7, 8, and 10, the single and double sections 102 and 104 are substantially unitary (or otherwise integral) in this embodiment, but may be considered to include a generally cylindrical body portion 140 and an outlet portion 142. With respect to the body portion 140, a fluidic passageway 144 is defined by an interior surface 145. The body portion 140 of the each of the single and double sections 102 and 104 terminates in an interconnect structure such as a female connection 146 and a male connection 148. The female connections 146 include respective and substantially identical (or similar) and opposed first and second brackets 150 and 152 disposed substantially outboard an outboard surface 156 displayed by the body portion 140 and in a flanking relation to an adjacent part of the body portion 140. Each first and second bracket 150 and 152 has a base 156, an outboard member 158 and an inboard member 160. The base 156 defines lateral openings 162 and 163. The openings 162 and 163 on opposed first and second brackets 150 and 152 are disposed and dimensioned so as to align. A slot 164 is defined between the outboard and inboard members 158 and 160. The generally central gap 166 is defined in the outboard member 158. A generally central tab 168 is defined by the inboard member 160. The tab 168 may be slightly smaller in height than the inboard member 160. Each bracket base 150 displays an inner surface 170 and an outboard surface 172. The inner surface 170 may be substantially continuous with the body interior surface 145 in some embodiments.

Each male connection 148 may be considered to include substantially identical lateral brackets 180 and 182 and a male connecting structure 184. The brackets 180 and 182 flank the male connecting structure 184 is the embodiment shown. The lateral brackets 180 and 182 are dimensioned so as to fit snugly between the female first and second brackets 150 and 152 and so that openings 186, defined in each lateral bracket 180 and 182, align with the female bracket openings 162 and 163. The male connecting structure 184, in turn, may define a respective outer surface 190 with a groove 192, respective inner surfaces 194 and 196, and an outboard surface 198. The groove 192 may accommodate a seal such as an o-ring 197. In the embodiment depicted, the inner surface 194 has a smaller diameter than the inner surface 196. The inner surface 196, in turn, has a smaller diameter than the inner surface 145 of the body portion 140.

Each outlet portion 142 may integrally include a valve 200 which has a generally cylindrical valve housing 202. The outlet portion 142 may also have a connector structure 204. In addition to the valve housing 202, the valve 200 may include a valve spool, and a valve handle (both disclosed infra). The valve housing 202 displays an inner surface 206. The valve housing inner surface 206 defines a valve housing bore 207 and communicates with a passageway 208 (shown in phantom in FIG. 3). The passageway 208 opens into (or otherwise is in fluid communication with) the body portion passageway 144. The outlet passageway 208 extends through the connector structure 204 as well. In one embodiment, the connector structure 204 is disclosed in copending, and above referenced, U.S. patent application Ser. No. 10/405,901.(attorney docket number 2351.06us02).

The valve housing bore 207 snugly accommodates a valve spool 210. A valve stem 212 may coaxially extend from the valve spool 210. In the embodiment disclosed, the valve stem 212 has an arcuate portion 214 and a generally planar portion 216. A notch 217 may be present on the planar portion 216 and may extend generally transversely to a longitudinal axis of the valve stem 212. The respective valve stem arcuate and planar portions 214 and 216 are accommodated by a correspondingly shaped bore 218 in the valve handle 220. The notch 217 may snugly fit a raised portion 222 in the valve handle bore 218 to more firmly secure the valve handle 220 to the valve stem 212 by a friction-enhanced fit. The valve spool 210 has a bore 224 defined by a bore interior surface 226. The bore 224 is generally orthogonal (or otherwise transverse) to a longitudinal axis 227 of the valve spool 210. The valve spool 210 also displays an exterior surface 228, the exterior surface 228 defining respective generally circumferential upper and lower grooves 230 and 232 and a pair of opposed middle grooves 234. The upper and lower grooves 223 and 224 are disposed proximate respective upper and lower end surfaces 236 and 238 of the valve spool 210 and the middle grooves 234 are generally circular (or otherwise arcuate) and generally follow the contour of the valve spool exterior surface 228. The upper and lower grooves 230 and 232 and the middle grooves 234 are dimensioned to operably receive respective o-rings 240 and 242. The lower end 238 may be in the form of a flange 244 with a larger diameter than the remainder of the valve spool 210.

The connector structure 204 includes a connector body 252, a collet 254, a collar 256, a guide 258, and a seal such as an o-ring a 260. Further and more detailed disclosure is contained in the above-referenced and copending U.S. Patent Application.

Figure 9:
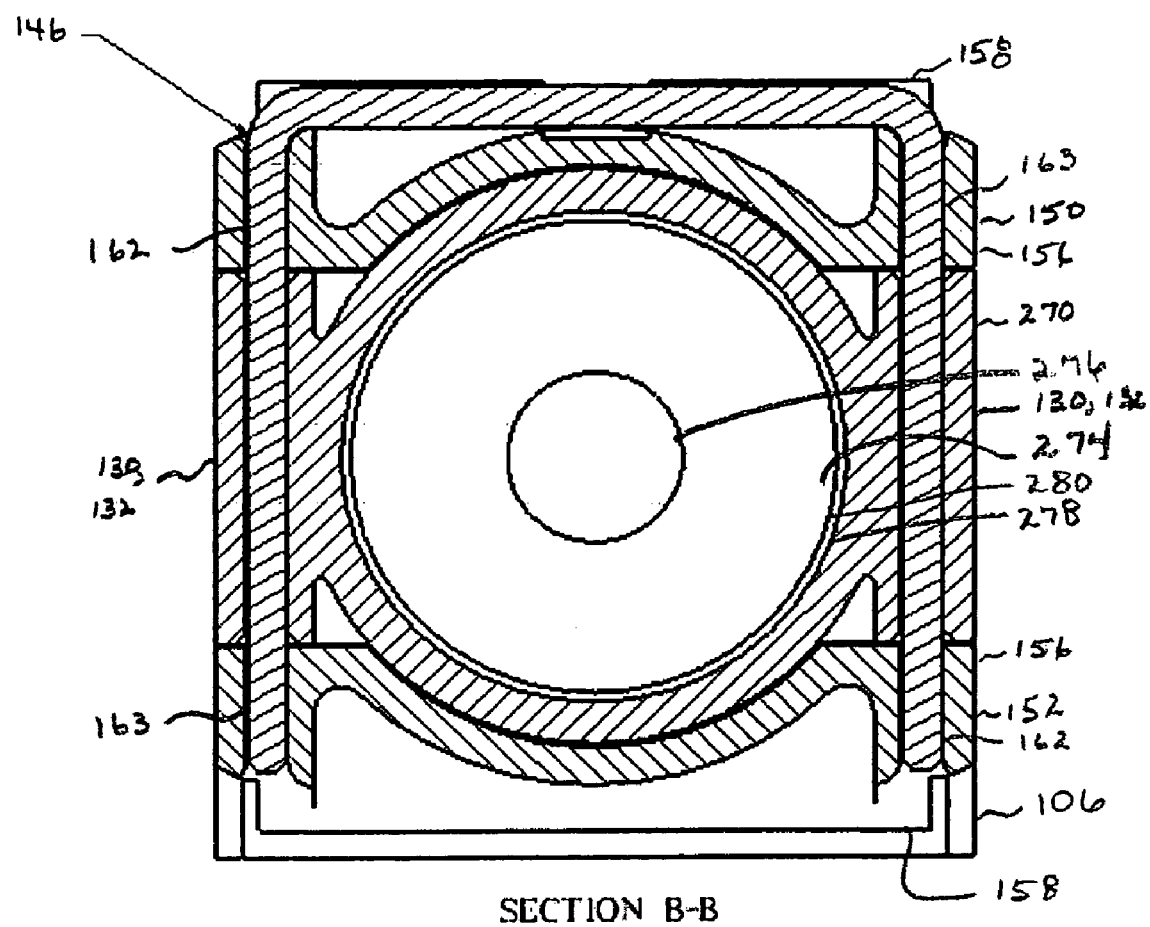
FIG. 9 is a cross section of an end section of FIG. 7 taken along line B—B.
Figure 10:
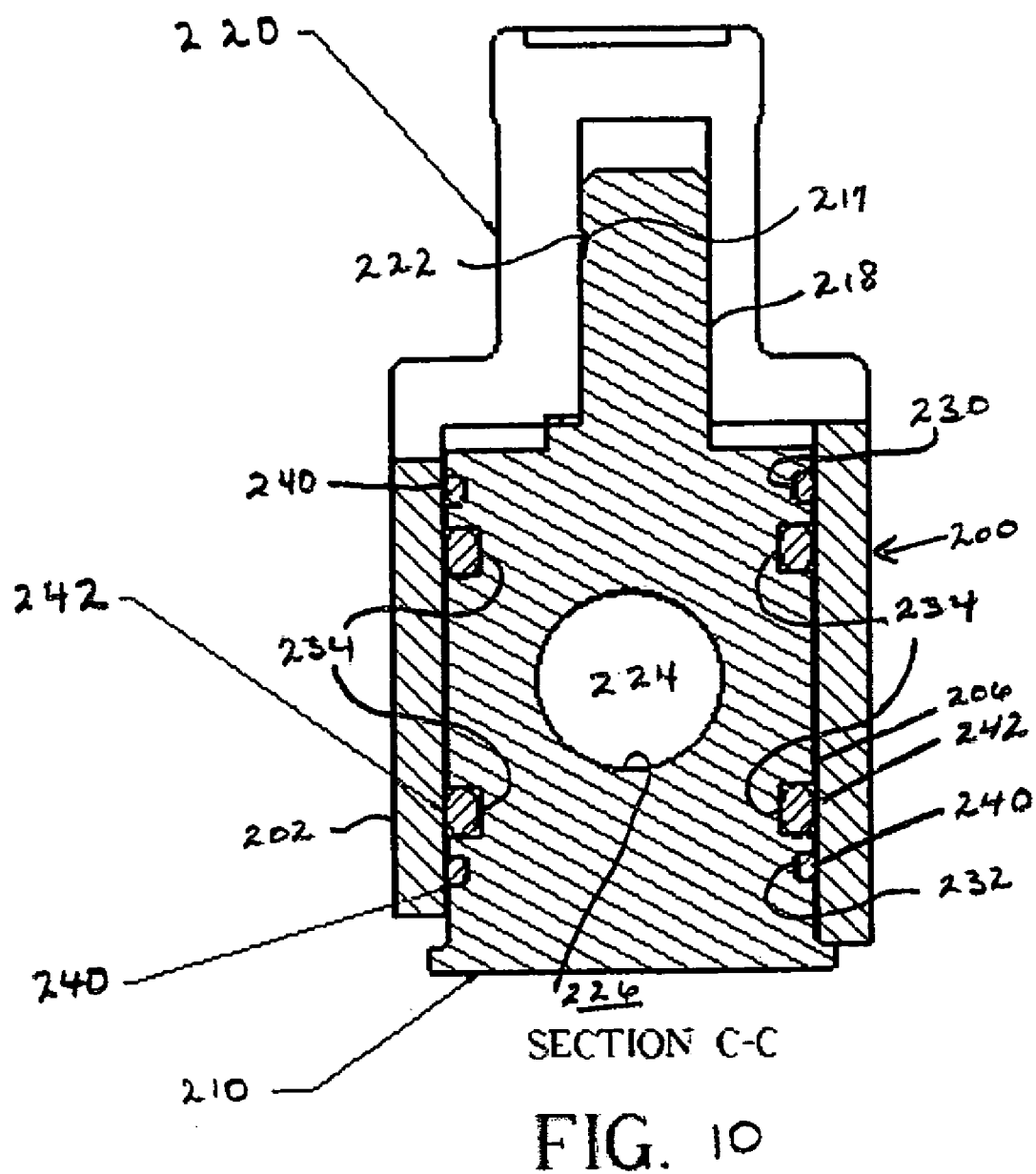
FIG. 10 is a cross section of an outlet portion of FIG. 7 taken along line C—C.
Figure 11:
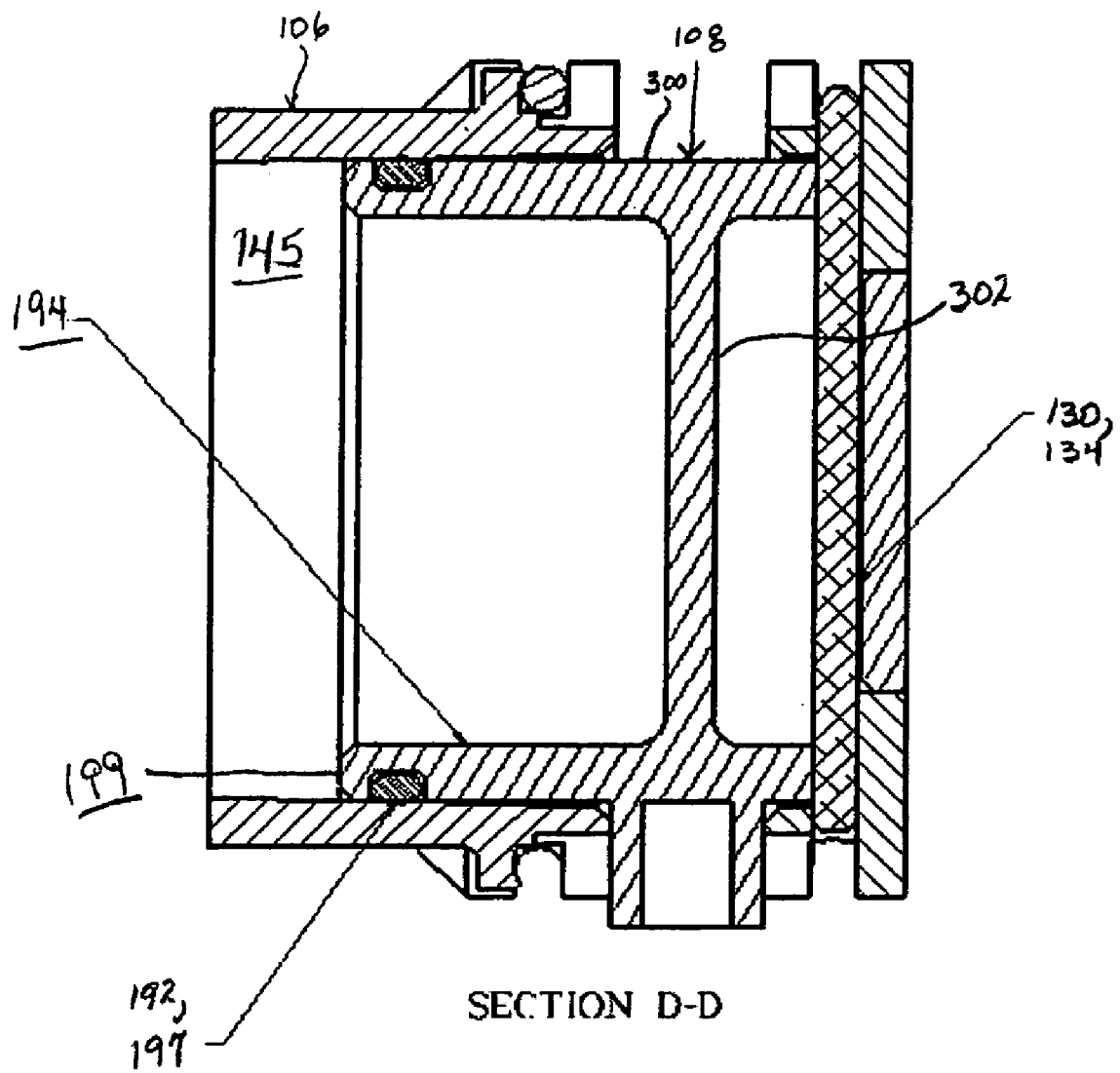
FIG. 11 is a cross section of a divider section of FIG. 7 taken along line D—D.

Referring specifically to FIGS. 2 and 9, embodiments of the end section 106 may be operably installed at each end of the present manifold to provide a fluid supply thereto. An exemplary embodiment of the present and section 106 may include a body portion 270 and an outlet portion 272. The body portion 270 and the outlet portion 272 may cooperate to define an extension of the body passageway 144, through which the fluid supply is enabled. While a fluid control device is not depicted, the outlet portion 272 may optionally include a control valve, such as the valve 200. In this embodiment the end section 106 has a female connection substantially identical to, or similar to, the female connection 146 disclosed supra and substantially similar (or identical) elements are numbered identically to those discussed with respect to the single and double sections 104 and 104 supra. However, in other embodiments of the present invention, a male connection, e.g., the male connection 148, may be present. In contrast to the single and double sections 102 and 104, the end section 106 includes a terminal partition 274, which defines an opening 276 fluidly communicating with the outlet portion 272. The end section 106 may also have respective first and second inner surfaces 278 and 280, the inner surface 278 with a larger diameter than the second inner surface 280. The outlet portion 272 extends generally coaxially from the body portion 270 and, in the embodiment depicted, has a valve (such as the valve 200 disclosed supra) and a connector structure installed therein, such as the connector structure 204. The body portion 270 may also include respective brackets 282 and 284, which may, in turn, define respective bores 286 and 288.

One embodiment of a divider section 108 is depicted in FIGS. 1, 2, 6, 7, and 11 and includes a body portion 300 defining a terminus of the body passageway 144 for the two fluid supply systems depicted. The divider section 108 shown has two male connections 148 and corresponding structural elements are marked identically to those shown and described supra. However, it is understood that female connections, such as female connection 146 or that a male connection 148 and a female connection 146 could be present if desired. Additionally, the divider section 108 has a partition 302 and a bracket 304 formed integrally with the lateral brackets 180 and 182 and defining bores 306.

The present body sections may be made from materials such as suitable synthetic resins, e.g., thermoplastics. Various thermoplastics and properties thereof are disclosed in "Handbook of Plastics, Elastomers, and Composites, Third Edition," Charles A. Harper (Editor-in-Chief), McGraw-Hill, New York (1996), the entire disclosure of the foregoing document hereby incorporated by reference. A person of ordinary skill in the art will recognize that several thermoplastics disclosed and described in the foregoing document may be identified for specific embodiments of the present invention without undue experimentation. In one embodiment, the present body sections are made from polysulfones or an acetal copolymer such as Delrin®, available from Dupont®. The present valve handles may be made from materials identified from the above-incorporated "Handbook of Plastics, Elastomers, and Composites," e.g., Delrin®. However, acrylonitrile butadiene styrene (ABS) may also be suitable for some embodiments. The present locking pins may be made from materials with the desired degree of stiffness, resilience, and resistance to corrosion, such as stainless steel or carbon or alloy steel and are available from Tri Star, Inc. of New Jersey. Seals such as O-rings may be made from such materials as ethylene-propylene-diene (EPDM) or nitrile rubber. Other suitable materials for the present seals may be readily identified from the above-referenced "Handbook of Plastics, Elastomers, and Composites, Third Edition" by persons of ordinary skill in the art.

In use, the present manifold is assembled by mating male and female connections of the manifold sections in the desired order. For example, in the manifold embodiment depicted in FIGS. 1 and 2, the divider section 108 may be mated to single sections 102. Recalling that this embodiment of the divider section 108 has only male connections 148, the male connections 148 are mated to the single section female connections 146. Mating these connections includes forcing the male connecting structure 184 into the passageway 144 of the female connection such that the male first inner surface 194 slidingly contacts the female inner surface 170 and such that the openings 186 of the brackets 180 and 82 align with the openings 162 and 163 of the brackets 150 and 152 of the female connection. At this point the male connection outboard surface 198 abuts the stepped transition between the male connection inner surface 170 and the interior surface of the body passageway 145. Also at this point, the O-ring 197 is in a sealing contact with the female connection inner surface 170. The mated sections may then be fixed in place by extending locking pin prongs 132 through the aligned openings 162–186–163 of the male and female brackets. When the outlet portion 142 of a single section 102 is in the desired orientation, the valve handle 220 may nonetheless be oriented such that the valve handle 220 will be inaccessible when the present manifold is operably installed on a surface. If so, the valve handle 220 may be separated from the valve stem 212 by exerting a force on the valve handle 220 away from the valve spool 210 until the valve stem a 212 is pulled from the valve handle bore 218. The valve spool 210 may then be removed from the valve housing 202, reversed, and inserted in an opposite vertical orientation. The valve spool 210 is then reinserted into the valve housing 202 until the spool flange 244 contacts the valve housing 202. The valve stem 212 is then reinserted in the valve handle 220 until the valve stem notch 217 is seated in the raised portion 222 of the valve handle bore 218. The present manifold sections are assembled in the desired order so as to deliver fluid to a specific pattern of fixtures. After the sections are in the desired order, end sections 106 are mated onto the terminal single or double sections and the assembled manifold may be fastened to a surface by extending fasteners, such as screws or nails, through the openings 306 in the divider sections and through the openings 286 and 288 of the end sections and into an underlying structure such as a joist or panel. The end sections are then connected to fluid sources, such as pressurized sources of hot and cold water. If valves are present in the outlet portions of the end sections 106, the valves are rotated until the valve spool bores 224 are coaxial with the connector passageway 208 to allow the pressurized fluids to flow into the body passageway 144 (formed by the interconnected section body portions). The fluid may then be admitted into the individual conduits and thereby to the fixtures by rotating the valves in the single and/or double sections as discussed supra. If desired, the fluid can be discontinued either from the pressurized fluid source or to the individual fixtures by rotating the valve handles (e.g., 90 degrees) so that the valve spool bores 224 are orthogonal (or otherwise transverse) to the connector passageway 208 and so that the valve stem exterior surface blocks the passageway 208, thereby forming a fluid-tight seal along with the O-rings 240 and 242.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A manifold section comprising:
  a body portion including a male connecting structure disposed at a first end of the body portion, and a female connecting structure disposed at a second end of the body portion, and a body portion passageway extending between the first and second ends; and
  a first outlet extending integrally from the body portion and defining first outlet passageway communicating with the body portion passageway, the first outlet including a valve having a valve housing and a valve spool rotatably received within the valve housing, a valve stem extending from an end of the valve spool and in which the valve housing accommodates the valve spool such that the valve stem is oriented in a first vertical direction and in which the valve housing also accommodates the valve spool such that the valve stem is oriented in a second vertical direction, the second vertical direction substantially 180 degrees with respect to the first vertical direction.

2. The manifold section of claim 1, in which the valve spool defines a bore and in which the valve spool bore is generally coaxial to the first outlet passageway when the valve spool bore is in a first pivotal position.

3. The manifold section of claim 2, in which the valve spool bore is generally transverse to the first outlet passageway when the valve spool bore is in a second pivotal position.

4. The manifold section of claim 3, further comprising a second outlet, the second outlet defining a second outlet passageway opening into the body portion passageway and comprising a valve.

5. The manifold section of claim 4, in which the first outlet further comprises a connector body a collet, a collar fixing the collet in the connector body, a guide disposed inboard the collet, and a seal disposal inboard the guide.

6. The manifold section of claim 5, in which the second outlet valve is substantially identical to the first outlet valve.

7. The manifold section of claim 6, in which the body portion is characterized by a longitudinal axis and in which the manifold section will mate with another substantially identical manifold section in a first orientation or in a second orientation, the second orientation in a substantially a 180 degree rotation from the first orientation about the body portion longitudinal axis.

8. A manifold assembly, comprising a plurality of manifold sections, each of said plurality of manifold sections comprising a body portion substantially identical to the manifold section of claim 7.

9. The manifold assembly of claim 8, in which the female connection of one of said plurality of manifold sections is mated to a male connection of another of said plurality of manifold section.

10. The manifold assembly of claim 9, further comprising a divider section, the divider section comprising a body portion and a partition disposed in the body portion, one of the plurality of manifold sections connected to a first end of the divider, another of the plurality of manifold sections connected to a second end of the divider.

11. The manifold assembly of claim 10, further comprising a first end section and a second end section, each said first and second end section comprising a body portion and an inlet portion extending coaxially from the end section body portion, the first end section in fluid communication with the first end of the divider section and the second end section in fluid communication with the second end of the divider section.

12. The manifold section of claim 1, wherein the body portion further comprises a first pair of brackets flanking the male connecting structure and a second pair of brackets flanking the female connecting structure, wherein each of the brackets include openings for accommodating locking pins.

* * * * *